(12) United States Patent
Yoshida et al.

(10) Patent No.: US 11,149,109 B2
(45) Date of Patent: *Oct. 19, 2021

(54) EPOXY RESIN COMPOSITION, CURED PRODUCT AND COMPOSITE MATERIAL

(71) Applicant: HITACHI CHEMICAL COMPANY, LTD., Tokyo (JP)

(72) Inventors: Yuka Yoshida, Tokyo (JP); Kazumasa Fukuda, Tokyo (JP); Yoshitaka Takezawa, Tokyo (JP)

(73) Assignee: SHOWA DENKO MATERIALS CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/311,966

(22) PCT Filed: Jun. 15, 2017

(86) PCT No.: PCT/JP2017/022174
§ 371 (c)(1),
(2) Date: Dec. 20, 2018

(87) PCT Pub. No.: WO2017/221811
PCT Pub. Date: Dec. 28, 2017

(65) Prior Publication Data
US 2020/0002464 A1 Jan. 2, 2020

(30) Foreign Application Priority Data
Jun. 22, 2016 (JP) .............................. JP2016-123976

(51) Int. Cl.
| | |
|---|---|
| C08G 59/24 | (2006.01) |
| C08G 59/50 | (2006.01) |
| C08L 63/00 | (2006.01) |
| C08K 3/04 | (2006.01) |
| C08K 7/06 | (2006.01) |
| C08J 5/10 | (2006.01) |
| C08J 5/04 | (2006.01) |

(52) U.S. Cl.
CPC ....... *C08G 59/245* (2013.01); *C08G 59/5033* (2013.01); *C08L 63/00* (2013.01); *C08K 3/04* (2013.01); *C08K 7/06* (2013.01)

(58) Field of Classification Search
None
See application file for complete search history.

(56) References Cited

U.S. PATENT DOCUMENTS

| | | | |
|---|---|---|---|
| 2003/0232964 A1* | 12/2003 | Akatsuka | ............... C08G 59/02 528/403 |
| 2012/0149807 A1 | 6/2012 | Asaumi et al. | |

FOREIGN PATENT DOCUMENTS

| | | | | |
|---|---|---|---|---|
| CN | 1465607 | A | 1/2004 | |
| CN | 102482242 | A | 5/2012 | |
| CN | 104024332 | A | 9/2014 | |
| JP | 2004-225034 | A | 8/2004 | |
| JP | 2011-074366 | A | 4/2011 | |
| JP | 2013234313 | A | * 11/2013 | ............... C08K 3/22 |
| JP | 2014-122337 | A | 7/2014 | |
| TW | 201124377 | A | 7/2011 | |
| WO | 2013/027687 | A1 | 2/2013 | |

* cited by examiner

*Primary Examiner* — Rachel Kahn
*Assistant Examiner* — Ha S Nguyen
(74) *Attorney, Agent, or Firm* — Fitch, Even, Tabin & Flannery, LLP

(57) ABSTRACT

An epoxy resin composition that comprises an epoxy resin and a curing agent, the epoxy resin comprising an epoxy compound that has, in one molecule, two or more structural units represented by the following Formula (I) and two or more epoxy groups, and the curing agent comprising a compound having two or more amino groups that are directly bound to an aromatic ring.

(I)

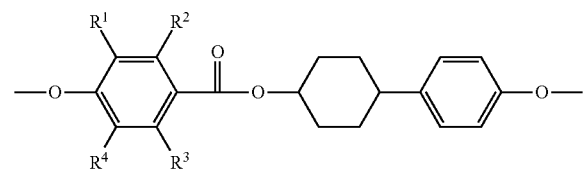

9 Claims, No Drawings

EPOXY RESIN COMPOSITION, CURED PRODUCT AND COMPOSITE MATERIAL

CROSS-REFERENCE TO RELATED APPLICATIONS

This application is a U.S. national phase application filed under 35 U.S.C. § 371 of International Application No. PCT/JP2017/022174, filed Jun. 15, 2017, which claims priority from Japanese patent application 2016-123976, filed Jun. 22, 2016, the entire contents of each of which are hereby incorporated herein by reference.

TECHNICAL FIELD

The invention relates to an epoxy resin composition, a cured product and a composite material.

BACKGROUND ART

Epoxy resin is widely used as a matrix resin of fiber-reinforced plastics (FRPs). Recently, epoxy resin is also used as a matrix resin of FRPs for aerospace industries which require a high level of properties such as fracture toughness, elasticity and heat resistance. However, although thermosetting resins, such as epoxy resin, have superior heat resistance, they tend to have less fracture toughness as compared with thermoplastic resins.

For the purpose of improving the fracture toughness of a cured product of epoxy resin, a method of using an epoxy resin having a high molecular weight or a curing agent having a high molecular weight, a method of obtaining a cured product of epoxy resin in which molecules are oriented by introducing a mesogenic group thereto, and the like have been proposed (see, for example, Patent Document 1 and Patent Document 2).

PRIOR ART DOCUMENTS

Patent Document

[Patent Document 1] Japanese Patent Application Laid-Open (JP-A) No. 2004-225034
[Patent Document 2] Japanese Patent Application Laid-Open (JP-A) No. 2014-122337

SUMMARY OF THE INVENTION

Problems to be Solved by the Invention

In a method of using an epoxy resin or a curing agent having a high molecular weight, there is a problem in that a cured product of epoxy resin tends to have a lower glass transition temperature (Tg), and the heat resistance of a FRP in which the epoxy resin is used as a matrix resin tends to decrease. In a method of introducing a mesogenic group into a molecule of epoxy resin, while a cured product obtained in ideal conditions is expected to exhibit excellent fracture toughness and heat resistance, there is a problem in that it is difficult to obtain a cured product in which molecules are oriented in an ideal manner, because an epoxy resin including a mesogenic group is generally highly crystalline and has a high melting point and a high viscosity.

Therefore, development of an epoxy resin that exhibits excellent fracture toughness and heat resistance in a cured state is anticipated.

In view of the above, the invention aims to provide an epoxy resin composition that exhibits excellent fracture toughness and heat resistance in a cured state, a cured product of the epoxy resin, and a composite material including the cured product.

Means for Solving the Problem

The means for solving the problem include the following embodiments.
<1> An epoxy resin composition that comprises an epoxy resin and a curing agent,
the epoxy resin comprising an epoxy compound that has, in one molecule, two or more structural units represented by the following Formula (I) and two or more epoxy groups, and
the curing agent comprising a compound having two or more amino groups that are directly bound to an aromatic ring.

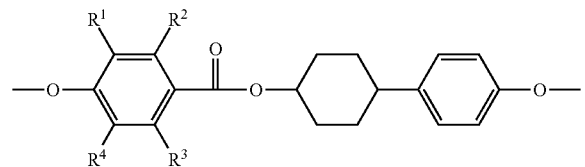

In Formula (I), each of $R^1$ to $R^4$ independently represents a hydrogen atom or an alkyl group having 1 to 3 carbon atoms.
<2> The epoxy resin composition according to <1>, wherein the epoxy compound has two structural units represented by Formula (I).
<3> The epoxy resin composition according to <1> or <2>, wherein the epoxy resin composition is capable of forming a smectic structure in a cured state.
<4> A cured product of the epoxy resin composition according to any one of <1> to <3>.
<5> A composite material comprising the cured product according to <4> and a reinforcing material.
<6> The composite material according to <5>, wherein the reinforcing material comprises a carbon material.

Effect of the Invention

According to the invention, an epoxy resin composition that exhibits excellent fracture toughness and heat resistance in a cured state, a cured product of the epoxy resin, and a composite material including the cured product are provided.

Embodiments for Implementing the Invention

In the following, the embodiments for implementing the invention are explained. However, the invention is not limited to the embodiments. The elements of the embodiments (including steps) are not essential, unless otherwise stated. The numbers and the ranges thereof do not limit the invention as well.

In the specification, the numerical range represented by "from A to B" includes A and B as a maximum value and a minimum value, respectively.

In the specification, when numerical ranges are described in a stepwise manner, the values of the upper or lower limit of each numerical range may be substituted by the values of the upper or lower limit of the other numerical range, or may be substituted by the values described in the Examples.

In the specification, when there are more than one kind of substances corresponding to a component of a composition, the content of the component refers to a total content of the substances, unless otherwise stated.

<Epoxy Resin Composition>

The epoxy resin composition of the embodiment includes an epoxy resin and a curing agent, the epoxy resin including an epoxy compound that has, in one molecule, two or more structural units represented by the following Formula (I) and two or more epoxy groups (hereinafter, also referred to as a specific epoxy compound), and the curing agent including a compound having two or more amino groups that are directly bound to an aromatic ring (hereinafter, also referred to as a specific curing agent).

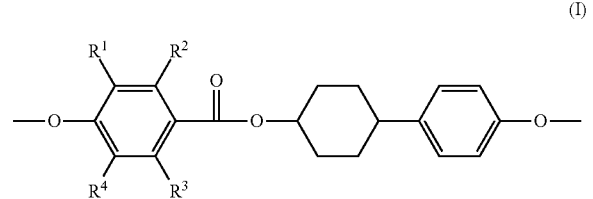

(I)

In Formula (I), each of $R^1$ to $R^4$ independently represents a hydrogen atom or an alkyl group having 1 to 3 carbon atoms. Each of $R^1$ to $R^4$ independently is preferably a hydrogen atom or an alkyl group having 1 or 2 carbon atoms, more preferably a hydrogen atom or a methyl group, further preferably a hydrogen atom.

Preferably, from 2 to 4 of the $R^1$ to $R^4$ are a hydrogen atom, more preferably 3 or 4 of the $R^1$ to $R^4$ are a hydrogen atom, further preferably all of the $R^1$ to $R^4$ are a hydrogen atom.

When any one of the $R^1$ to $R^4$ is an alkyl group having 1 to 3 carbon atoms, at least one of $R^1$ or $R^4$ is preferably an alkyl group having 1 to 3 carbon atoms.

The epoxy resin composition of the embodiment exhibits excellent fracture toughness and heat resistance in a cured state. The reason for this has not become clear, but is presumed as set forth below.

First, by using an epoxy compound having two or more structural units represented by Formula (I) and two or more epoxy groups in one molecule, it becomes possible to lower a melting point and viscosity of the epoxy resin. As a result, it becomes possible to obtain a cured product in which a smectic structure is formed under ordinary curing conditions, thereby achieving a superior fracture toughness as compared with a case in which other epoxy resins having a mesogenic structure are used.

Further, by using a compound having two or more amino groups that are directly bound to an aromatic ring as a curing agent, it becomes easier to form a smectic structure in a cured product as compared with a case in which other curing agents are used, thereby achieving a superior fracture toughness.

The structural unit represented by Formula (I) is a mesogenic structure. In the specification, the mesogenic structure represents a structure that facilitates expression of crystallinity or liquid crystallinity by way of molecular interaction. Specific examples of the mesogenic structure include a biphenyl structure, a phenylbenzoate structure, an azobenzene structure, a stilbene structure, and derivatives of these structures.

An epoxy compound having a mesogenic structure in its molecule tends to form a higher-order structure in a cured resin matrix, thereby achieving a higher thermal conductivity. The higher-order structure refers to a structure in which structural elements are arranged to form a micro-and-organized structure. Examples of the higher-order structure include a crystalline phase and a liquid crystalline phase, and existence thereof can be determined by observing with a polarizing microscope. Specifically, existence of a higher-order structure can be determined by whether or not an interference pattern due to depolarization is observed under crossed Nicols. A higher-order structure in a cured epoxy resin composition generally forms a domain structure in the form of an island, and each island corresponds to a higher-order structure. The structural elements of the higher-order structure are generally formed by covalent bonding.

Examples of a highly organized higher-order structure derived from a mesogenic structure includes a nematic structure and a smectic structure, which are a type of liquid crystal structure, respectively. The nematic structure is a liquid crystal structure that has only an orientational order in which molecules are arranged in one direction. The smectic structure is a liquid crystal structure that has a one-dimensional order in addition to an orientational order, and forms a lamellar structure. The degree of order is higher in a smectic structure than in a nematic structure. An epoxy compound having a structural unit represented by Formula (I) as a mesogenic structure tends to form a smectic structure when it is cured more easily than other epoxy compounds having a mesogenic structure.

Whether or not a smectic structure is formed in a cured product of the epoxy resin composition can be determined by X-ray diffraction using, for example, an X-ray diffractometer from Rigaku Corporation. When measurement is performed using CuKα1 line under a tube voltage of 40 kV, a tube current of 20 mA in a range of 2θ=2° to 30°, a cured product having a smectic structure exhibits a diffraction peak in a range of 2θ=2° to 10°.

(Epoxy Resin)

The epoxy resin includes a specific epoxy compound. The structure of a specific epoxy compound is not particularly limited as long as it has two or more structural units represented by Formula (I) and two or more epoxy groups. The epoxy resin composition may include a single kind of specific epoxy compound or two or more kinds thereof.

The number of the structural unit represented by Formula (I) in one molecule is not particularly limited as long as it is two or more. From the viewpoint of heat resistance, the average number of the structural unit represented by Formula (I) in one molecule is preferably 5 or less, more preferably 3 or less. From the viewpoint of heat resistance, the specific epoxy compound preferably includes a specific epoxy compound that has two structural units represented by Formula (I) in one molecule.

In the specification, a specific epoxy compound having two or more structural units represented by (I) in one molecule is occasionally referred to as a multimeric compound, and a specific epoxy compound having two structural units represented by (I) in one molecule is occasionally referred to as a dimeric compound.

The specific epoxy compound may be a multimeric compound that has at least one selected from the group consisting of a structural unit represented by the following (IA) and a structural unite represented by the following Formula (IB).

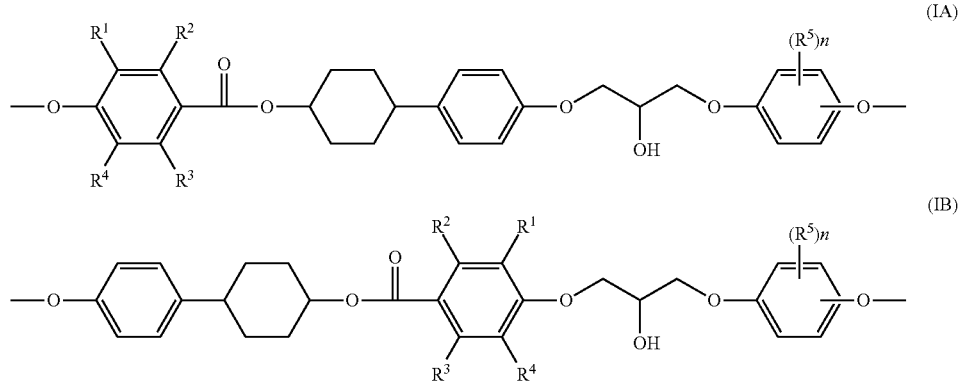

In Formula (IA) and Formula (IB), each of $R^1$ to $R^4$ independently represents a hydrogen atom or an alkyl group having 1 to 3 carbon atoms, each of $R^5$ independently represents an alkyl group having 1 to 8 carbon atoms, and n represents an integer of 0 to 4.

Specific examples of $R^1$ to $R^4$ in Formula (IA) and Formula (IB) and preferred embodiments thereof are the same as that of $R^1$ to $R^4$ in Formula (I).

In Formula (IA) and Formula (IB), n is an integer of 0 to 4, preferably an integer of 0 to 2, more preferably 0 or 1, further preferably 0. In other words, the benzene ring to which $R^5$ is bound preferably has 2 to 4 hydrogen atoms, more preferably 3 or 4 hydrogen atoms, further preferably 4 hydrogen atoms.

When the specific epoxy compound is a dimeric compound having two structural units represented by Formula (I) in one molecule, examples of the dimeric compound include at least one selected from the group consisting of the compounds represented by the following Formulas (II-A) to (II-C). The definitions of $R^1$ to $R^5$ and n are the same as the definition of $R^1$ to $R^5$ in Formula (IA) and Formula (IB), and preferred embodiments thereof are also the same.

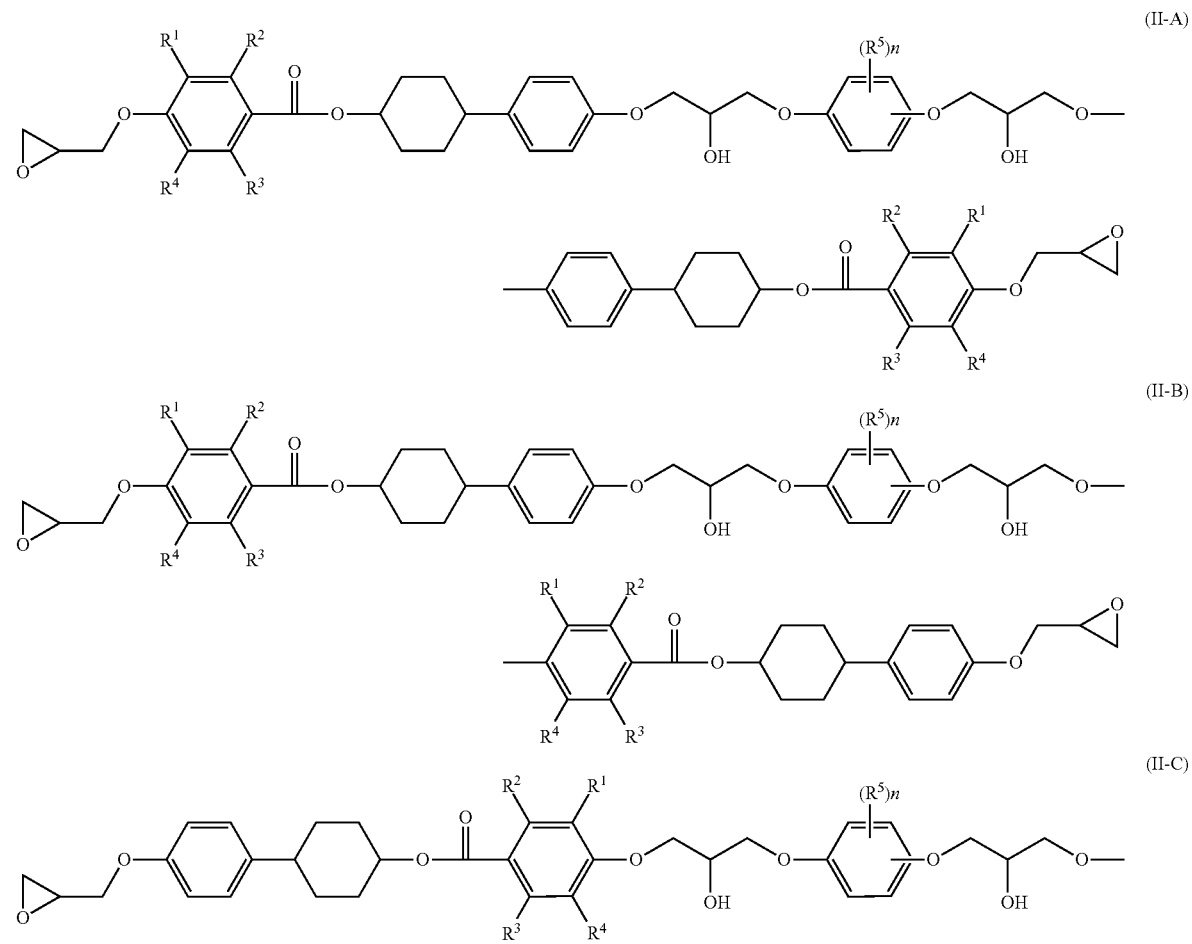

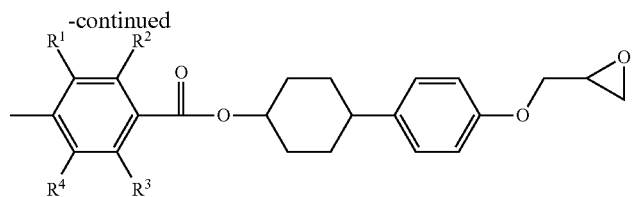

Examples of the dimeric compounds represented by Formulas (II-A) to (II-C) include at least one selected from the group consisting of the compounds represented by the following Formulas (II-A') to (II-I'). The definitions of $R^1$ to $R^5$ and n are the same as the definition of $R^1$ to $R^5$ in Formula (IA) and Formula (IB), and preferred embodiments thereof are also the same.

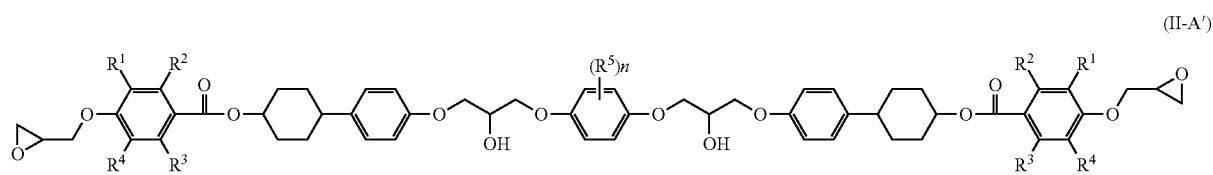

(II-A')

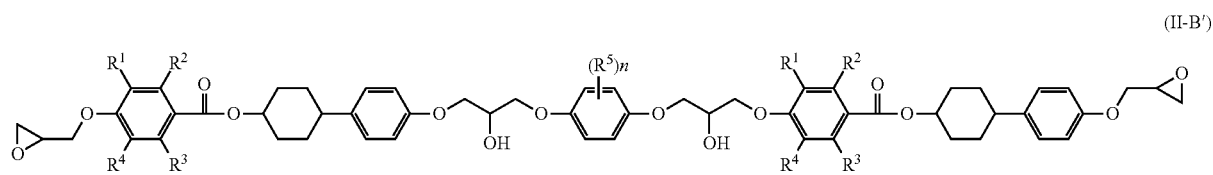

(II-B')

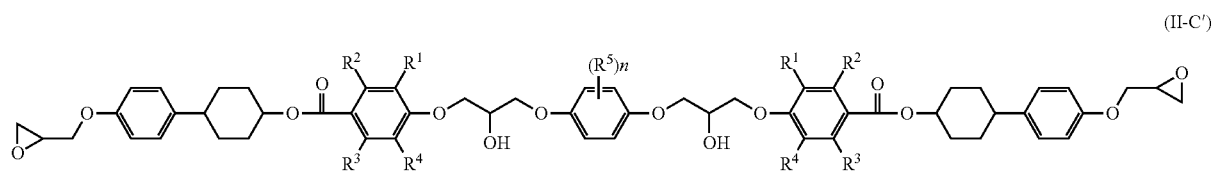

(II-C')

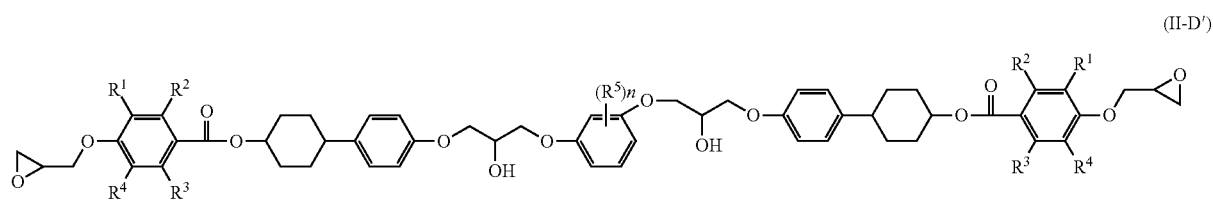

(II-D')

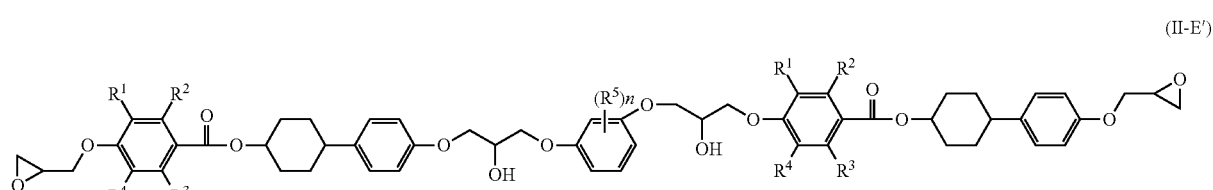

(II-E')

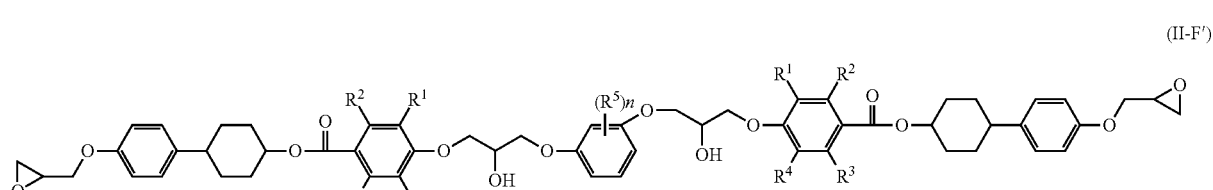

(II-F')

(II-G′)
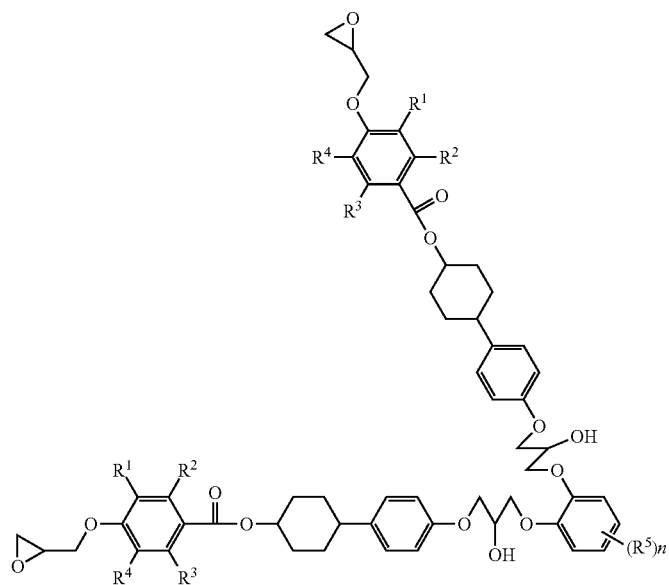
(II-H′)
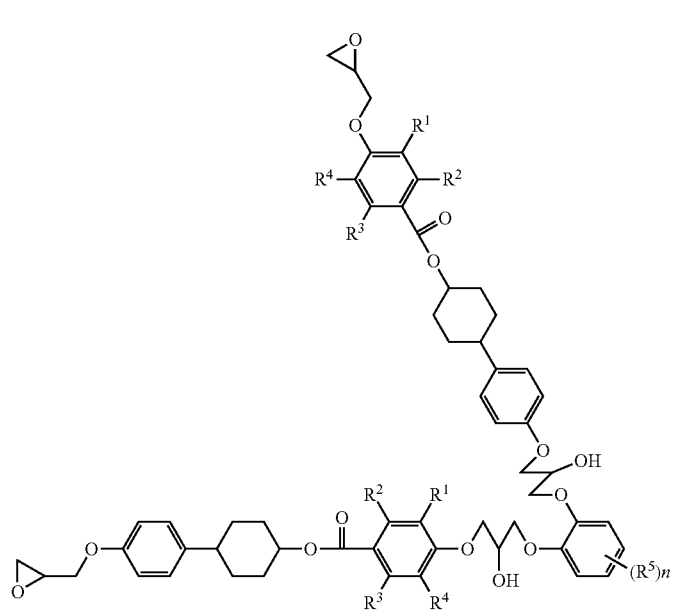

(II-I')

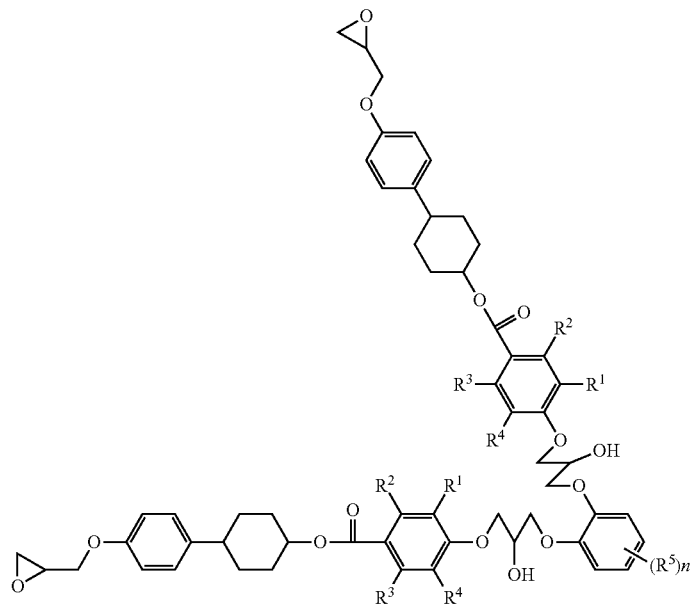

From the viewpoint of handleability, the content of the specific epoxy compound in the total epoxy resin is preferably 10% by mass or more, more preferably 20% by mass or more, further preferably 30% by mass or more. From the viewpoint of heat resistance, the content of the specific epoxy compound in the total epoxy resin is preferably 80% by mass or less, more preferably 75% by mass or less, further preferably 70% by mass or less.

When the epoxy resin composition includes a dimeric compound as a specific epoxy compound, the content thereof is not particularly limited. From the viewpoint of handleability, the content of the dimeric compound in the total epoxy resin is preferably 10% by mass or more, more preferably 15% by mass or more, further preferably 20% by mass or more. From the viewpoint of heat resistance, the content of the dimeric compound in the total epoxy resin is preferably 60% by mass or less, more preferably 55% by mass or less, further preferably 50% by mass or less.

The epoxy resin composition may include a compound represented by the following Formula (M) (hereinafter, also referred to as a specific epoxy monomer).

(M)

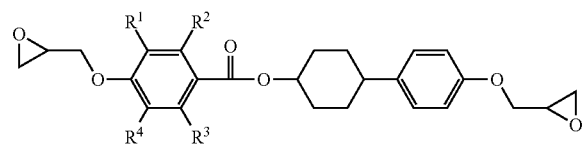

In Formula (M), each of $R^1$ to $R^4$ independently represents a hydrogen atom or an alkyl group having 1 to 3 carbon atoms. Definitions and preferred embodiments of $R^1$ to $R^4$ are the same as that in Formula (I).

When the epoxy resin composition includes a specific epoxy monomer, the content thereof is not particularly limited. From the viewpoint of heat resistance, the content of the specific epoxy monomer in the total epoxy resin is preferably 30% by mass or more, more preferably 35% by mass or more, further preferably 40% by mass or more. From the viewpoint of handleability, the content of the specific epoxy monomer in the total epoxy resin is preferably 90% by mass or less, more preferably 80% by mass or less, further preferably 70% by mass or less.

The epoxy resin composition may include epoxy resin components other than the specific epoxy compound and the specific epoxy monomer (other epoxy resin components).

When the epoxy resin composition includes other epoxy resin components, the content thereof is preferably 15% by mass or less, more preferably 10% by mass or less, further preferably 8% by mass or less. Particularly preferably, the epoxy resin substantially does not include other epoxy resin components.

In the embodiment, the content of specific epoxy compound, specific epoxy monomer and other epoxy resin components are measured by reversed phase liquid chromatography (RPLC). The measurement is performed by a gradient method using a RPLC column for analysis (Mightysil RP-18, Kanto Chemical Co., Inc.) while continuously changing the mixture ratio (by volume) of the eluent in the order of acetonitrile/tetrahydrofuran/water=20/5/75, acetonitrile/tetrahydrofuran=80/20 (20 min from the start) and acetonitrile/tetrahydrofuran=50/50 (35 min from the start) at a flow rate of 1.0 ml/min.

In the specification, the content of a compound [% by mass] in the total epoxy resin is determined as a proportion of the area of a peak corresponding to the compound with respect to the total area of all peaks, given as 100, detected in light absorbance at a wavelength of 280 nm.

The epoxy equivalent of the epoxy resin is not particularly limited. From the viewpoint of fluidity of the epoxy resin compound and thermal conductivity of the cured product, the epoxy equivalent is preferably from 245 g/eq to 500 g/eq, more preferably from 250 g/eq to 450 g/eq, further preferably from 260 g/eq to 400 g/eq. When the epoxy equivalent of the epoxy resin is 245 g/eq or more, crystallinity of the epoxy resin is not too high and a favorable fluidity of the epoxy resin composition tends to be maintained. When the epoxy equivalent of the epoxy resin is 300 g/eq or less, a cured product tends to exhibit a favorable thermal conductivity as a result of maintaining sufficient crosslink density of the epoxy resin. In the embodiment, the epoxy equivalent is measured by perchloric acid titration.

From the viewpoint of fluidity of the epoxy resin composition and thermal conductivity of the cured product, the number average molecular weight (Mn) of the epoxy resin as measured by gel permeation chromatography (GPC) is preferably from 400 to 1400, more preferably from 45 to 1300, further preferably from 500 to 1200. When the Mn of the epoxy resin is 400 or more, crystallinity of the epoxy resin is not too high and a favorable fluidity of the epoxy resin composition tends to be maintained. When the Mn of the epoxy resin is 800 or less, a cured product tends to exhibit a favorable thermal conductivity as a result of maintaining sufficient crosslink density of the epoxy resin.

In the specification, the GPC measurement is performed by using G2000HXL and 3000 HXL (Tosoh Corporation) as GPC columns for analysis and tetrahydrofuran for a mobile phase, at a sample concentration of 0.2% by mass and a flow rate of 1.0 ml/min. A calibration curve is obtained by using a polystyrene standard sample, and the Mn (polystyrene-based) is calculated.

The method of synthesizing the specific epoxy compound is not particularly limited. For example, the specific epoxy compound may be synthesized by causing reaction of a specific epoxy monomer and a compound having a functional group that can react with an epoxy group of the specific epoxy monomer. In this method, a specific epoxy compound having a desired structure can be obtained by controlling the type, the amount or the like of the compounds.

Specifically, for example, a specific epoxy compound can be synthesized by dissolving, in a solvent, a specific epoxy monomer and a compound having a functional group that can react with an epoxy group of the specific epoxy monomer, and heating the obtained solution while stirring. Alternatively, a specific epoxy compound may be synthesized by melting a specific epoxy monomer to cause reaction without using a solvent. From the viewpoint of safety, it is preferred to use a solvent that does not need to be heated to a temperature at which the specific epoxy monomer is melted.

The solvent is not particularly limited, as long as it can dissolve a specific epoxy monomer and a compound having a functional group that can react with an epoxy group of the specific epoxy monomer, and can be heated to a temperature at which reaction of the compounds is caused. Specific examples of the solvent include cyclohexanone, cyclopentanone, ethyl lactate, propyleneglycol monomethyl ether and N-methyl pyrrolidone.

The amount of the solvent is not particularly limited, as long as a specific epoxy monomer and a compound having a functional group that can react with an epoxy group of the specific epoxy monomer, and a reaction catalyst that can be optionally used, can be dissolved at a reaction temperature. Although the degree of solubility differs depending on the type of the raw materials, type of the solvent and the like, the viscosity of the solvent after reaction tends to be in a preferred range when the amount of the solvent is such that the initial solid content concentration is from 20% by mass to 60% by mass, for example.

The compound having a functional group that can react with an epoxy group of a specific epoxy monomer is not particularly limited. From the viewpoint of forming a smectic structure in a cured product, the compound is preferably a compound having a structure in which two hydroxy groups are bound to a benzene ring (hereinafter, also referred to as a divalent phenol compound).

By causing reaction of an epoxy group of a specific epoxy monomer and a hydroxy group of a divalent phenol compound, a compound having at least one selected from the group consisting of a structural unit represented by Formula (IA) and a structural unit represented by Formula (IB) can be synthesized.

Examples of the divalent phenol compound include catechol (a compound having a hydroxy group at an ortho position with respect to the other hydroxy group on the benzene ring), resorcinol (a compound having a hydroxy group at a meta position with respect to the other hydroxy group on the benzene ring) and hydroquinone (a compound having a hydroxy group at a para position with respect to the other hydroxy group on the benzene ring). Derivatives of these compounds include a compound having a substituent, such as an alkyl group having 1 to 8 carbon atoms, on the benzene ring of catechol, resorcinol or hydroquinone.

From the viewpoint of forming a smectic structure in a cured product, the divalent phenol compound is preferably catechol, resorcinol or hydroquinone, more preferably hydroquinone. Since hydroquinone has a hydroxy group at a para position with respect to the other hydroxy group, a specific epoxy compound obtained by reacting the same with a specific epoxy monomer tends to have a straight structure. Therefore, a smectic structure tends to be formed by a high degree of stacking of the molecules. A single kind of the divalent phenol compound may be used alone, or two or more kinds may be used in combination.

The type of the reaction catalyst is not particularly limited, and may be selected based on reaction rate, reaction temperate, storage stability and the like. Specific examples of the reaction catalyst include an imidazole compound, an organic phosphorous compound, a tertiary amine compound and a quaternary ammonium salt. A single kind of the reaction catalyst may be used alone, or two or more kinds may be used in combination.

From the viewpoint of heat resistance of a cured product, the reaction catalyst is preferably an organic phosphorous compound.

Examples of the organic phosphorous compound include an organic phosphine compound; a compound having intermolecular polarization obtained by adding, to an organic phosphine compound, a compound having a n bond such as a maleic acid anhydride, a quinone compound, diazodiphenyl methane or a phenol resin; and a complex formed by an organic phosphine compound and an organic boron compound.

Specific examples of the organic phosphine compound include triphenylphosphine, diphenyl(p-tolyl)phosphine, tris (alkylphenyl)phosphine, tris(alkoxyphenyl)phosphine, tris (alkylalkoxyphenyl)phosphine, tris(dialkylphenyl)phosphine, tris(trialkylphenyl)phosphine, tris(tetraalkylphenyl) phosphine, tris(dialkoxyphenyl)phosphine, tris (trialkoxyphenyl)phosphine, tris(tetraalkoxyphenyl) phosphine, trialkylphosphine, dialkylarylphosphine and alkyldiarylphosphine.

Specific examples of the quinone compound include 1,4-benzoquinone, 2,5-toluquinone, 1,4-naphthoquinone, 2,3-dimethylbenzoquinone, 2,6-dimethylbenzoquinone, 2,3-dimethoxy-5-methyl-1,4-benzoquinone, 2,3-dimethoxy-1,4-benzoquinone and phenyl-1,4-benzoquinone.

Specific examples of the organic boron compound include tetraphenylborate, tetra-p-tolylborate and tetra-n-butylborate.

The amount of the reaction catalyst is not particularly limited. From the viewpoint of reaction rate and storage stability, the amount of the reaction catalyst is preferably from 0.1 parts by mass to 1.5 parts by mass, more preferably from 0.2 parts by mass to 1 part by mass, with respect to 100 parts by mass of the total amount of the specific epoxy monomer and the compound having a functional group that can react with an epoxy group of the specific epoxy monomer.

In a case of synthesizing a specific epoxy compound using a specific epoxy monomer, the specific epoxy monomer may totally react to form a specific epoxy compound, or the specific epoxy monomer may partly remain in an unreacted state.

A specific epoxy compound can be synthesized by using a reaction container, such as a flask (for example, made of glass) in a small scale or a reaction cauldron (for example, made of stainless steel) in a large scale. A specific example of the synthesis method is described below.

A specific epoxy monomer is placed in a reaction container and a solvent is poured therein, and the specific epoxy monomer is dissolved by heating the reaction container to a reaction temperature with an oil bath or a heating medium. Then, a compound having a functional group that can react with an epoxy group of the specific epoxy monomer (such as a divalent phenol compound) is further introduced thereto. After dissolving the compound in the solvent, a reaction catalyst is added to start the reaction. After a lapse of a predetermined time, the reacted solution including a specific epoxy compound is collected. It is also possible to collect a specific epoxy compound in a solid state at room temperature (25° C.) by removing the solvent from the reacted solution under the condition with heating and reduced pressure.

The reaction temperature is not particularly limited, as long as the reaction of an epoxy group and a functional group that can react with an epoxy group (for example, a phenolic hydroxy group) under the presence of a reaction catalyst can proceed. For example, the reaction temperature is preferably in a range of from 100° C. to 180° C., more preferably from 100° C. to 150° C. When the reaction temperature is 100° C. or higher, the time to complete the reaction tends to be shortened. When the reaction temperature is 180° C. or less, possibility of causing gelation tends to be reduced.

The ratio of the specific epoxy monomer and the compound having a functional group that can react with an epoxy group of the specific epoxy monomer (for example, a phenolic hydroxy group) is not particularly limited. For example, the ratio may be adjusted to satisfy a ratio of the number of equivalent of epoxy group (A) to the ratio of the number of equivalent of the functional group that can react with an epoxy group (B) (A/B) may be from 100/100 to 100/1. From the viewpoint of fracture toughness and heat resistance of a cured product, the value of A/B is preferably from 100/50 to 100/1.

The structure of the specific epoxy compound can be determined by, for example, matching a molecular weight of a compound that is presumed to be obtained by the reaction of the specific epoxy monomer and the compound having a functional group that can react with an epoxy group of the specific epoxy monomer with a molecular weight of a target compound obtained by liquid chromatography performed by a liquid chromatograph having a UV spectrum detector and a mass spectrum detector.

The liquid chromatography is performed by a gradient method using a column for analysis (for example, LaChrom II C16 from Hitachi, Ltd.) while continuously changing the mixture ratio (by volume) of the eluent in the order of acetonitrile/tetrahydrofuran/10 mmol/l aqueous ammonium acetate solution=20/5/75, acetonitrile/tetrahydrofuran=80/20 (20 min from the start) and acetonitrile/tetrahydrofuran=50/50 (35 min from the start) at a flow rate of 1.0 ml/min. The UV spectrum detector detects an absorbance at a wavelength of 280 nm and the mass spectrum detector detects an ionization voltage as 2700 V.

(Curing Agent)

The curing agent includes a specific curing agent. The specific curing agent is not particularly limited, as long as it is a compound having two or more amino groups that are directly bound to an aromatic ring. The epoxy resin composition may include a single kind of a specific curing agent alone, or may include two or more kinds in combination.

Specific examples of the specific curing agent include 3,3'-diamnodiphenylsulfone, 4,4'-diaminodiphenylsulfone, 4,4'-diaminodiphenylmethane, 4,4'-diaminodiphenylether, 4,4'-diamino-3,3'-dimethoxybiphenyl, 4,4'-diaminophenylbenzoate, 1,5-diaminonaphthalene, 1,3-diaminonaphthalene, 1,4-diaminonaphthalene, 1,8-diaminonaphthalene, m-phenylenediamine, p-phenylenediamine, 4,4'-diaminobenzanilide and trimethylene-bis-4-aminobenzoate.

From the viewpoint of forming a smectic structure in a cured product, the specific curing agent is preferably selected from 4,4'-diaminodiphenylsulfone, m-phenylenediamine, p-phenylenediamine, 4,4'-diaminobenzanilide, 1,5-diaminonaphthalene, 4,4'-diaminodiphenylmethane or trimethylene-bis-4-aminobenzoate. From the viewpoint of obtaining a cured product with a high Tg, the specific curing agent is more preferably selected from 4,4'-diaminodiphenylsulfone or 4,4'-diaminobenzanilide.

The content of the curing agent in the epoxy resin composition is not particularly limited. From the viewpoint of efficiency of curing reaction, the content of the curing agent preferably satisfies a ratio of the active hydrogen equivalent (amine equivalent) of the curing agent to the epoxy equivalent (amine equivalent/epoxy equivalent) of from 0.3 to 3.0, more preferably from 0.5 to 2.0.

(Other Components)

The epoxy resin composition may include components other than the epoxy resin and the curing agent. For example, the epoxy resin composition may include a reaction catalyst. Specific examples of the reaction catalyst include the compounds described above as a reaction catalyst used for the synthesis of the specific epoxy compound.

<Cured Product and Composite Material>

The cured product of the embodiment is obtained by curing the epoxy resin composition of the embodiment. The cured product is superior both in fracture toughness and heat resistance. Accordingly, the cured product is suitably used for applications in which fracture toughness and heat resistance are required at high levels.

The composite material of the embodiment includes a cured product of the epoxy resin composition of the embodiment and a reinforcing material. The material of the reinforcing material is not particularly limited, and may be selected depending on applications of the composite material and the like.

Specific examples of the reinforcing material include carbon material, glass, aromatic polyamide resin such as Kevlar (registered trade name), ultra high molecular weight polyethylene, alumina, boron nitride, aluminum nitride, mica and silicon. The form of the reinforcing material is not particularly limited, and examples thereof include fibers and particles (filler). From the viewpoint of intensity, the reinforcing material is preferably a carbon material, more preferably carbon fibers. The composite material may include a single kind of reinforcing material alone or may include two or more kinds in combination.

Since the composite material of the embodiment includes the cured product of the embodiment, the composite material is superior in both fracture toughness and heat resistance. Accordingly, the composite material is suitably used as FRPs for applications in which fracture toughness and heat resistance are required at high levels, such as airplanes and spaceships.

EXAMPLES

In the following, the invention is explained by referring to the Examples. However, the invention is not limited to these Examples. Unless otherwise specified, "part" and "%" are based on mass.

<Synthesis Method of Resin 1>

To a 500-mL three-necked flask, 50 g (0.118 mol) of a compound represented by the following formula (4-{4-(2,3-epoxypropoxy)phenyl}cyclohexyl=4-(2,3-epoxypropoxy)benzoate (specific epoxy monomer) were placed, and 80 g of propylene glycol monomethyl ether were added. A cooling tube and a nitrogen inlet tube were attached to the flask, and a stirring blade was placed so as to be immersed in the solvent. Then, the flask was immersed in an oil bath at 120° C. and subjected to stirring. After confirming that the epoxy monomer was dissolved and the solution became clear, hydroquinone as a divalent phenol compound (Wako Pure Chemical Corporation, hydroxy equivalent: 55 g/eq) was added such that the equivalent ratio of epoxy group to phenolic hydroxy group (A/B) was 100/13. Then, 0.5 g of triphenylphoshine as a reaction catalyst were added and further heated at 120° C. After continuing the heating for 5 hours, propylene glycol monomethyl ether was evaporated under reduced pressure, and the residue was cooled to room temperature (25° C.), and Resin 1, in which part of the epoxy monomer formed a prepolymer, was obtained.

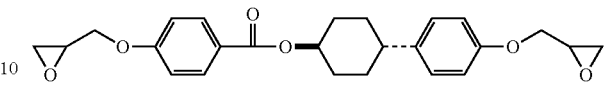

It was confirmed that a compound having at least one of the following structures (corresponding to a dimeric compound of the epoxy monomer) was included in Resin 1, by matching a molecular weight of a target compound obtained by liquid chromatography performed by a liquid chromatograph having a UV spectrum detector and a mass spectrum detector.

The liquid chromatography was performed by a gradient method using a column for analysis (LaChrom II C16 from Hitachi, Ltd.) while continuously changing the mixture ratio (by volume) of the eluent in the order of acetonitrile/tetrahydrofuran/10-mmol/l aqueous ammonium acetate solution=20/5/75, acetonitrile/tetrahydrofuran=80/20 (20 min from the start) to acetonitrile/tetrahydrofuran=50/50 (35 min from the start) at a flow rate of 1.0 ml/min. The UV spectrum detector detected an absorbance at a wavelength of 280 nm, and a peak of a compound having a structure below was observed at 17.4 min and a peak of the epoxy monomer was observed at 14.9 min. The mass spectrum detector detects an ionization voltage as 2700 V. As a result, the molecular weight of at least one of the compound having a structure below was 959, with addition of one proton.

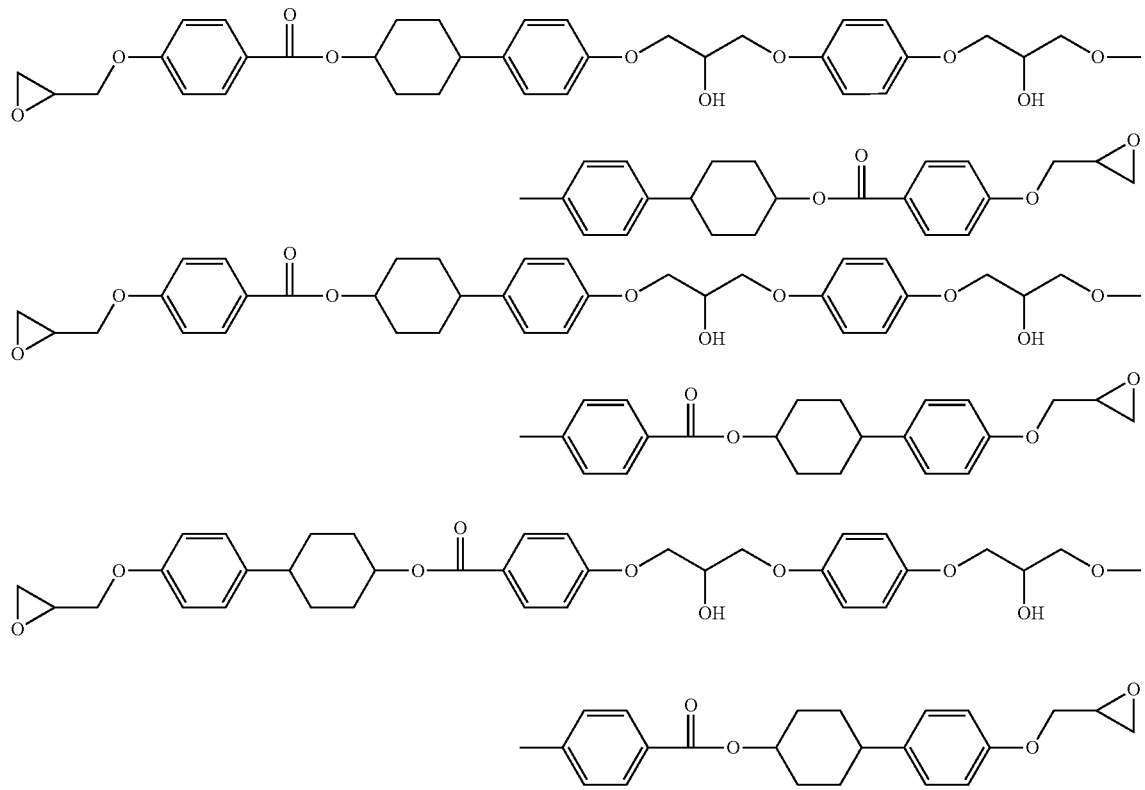

The solid content of Resin 1 was measured by a loss on heating test, and the result was 99.6%. The test was conducted by placing a sample in an aluminum cap by 1.0 g to 1.1 g in an oven at 180° C. for 30 minutes. The solid content was calculated by the following formula.

Solid amount (%)=(weight of sample after 30-min heating)/weight of sample before heating)*100

The epoxy equivalent of Resin 1, as measured by perchloric acid titration, was 275 g/eq.

The content of the dimeric compound and the content of the specific epoxy monomer remaining unreacted, in the total epoxy resin, were measured by reversed phase liquid chromatography (RPLC). The measurement was performed by a gradient method using a RPLC column for analysis (Mightysil RP-18, Kanto Chemical Co., Inc.) while continuously changing the mixture ratio (by volume) of the eluent in the order of acetonitrile/tetrahydrofuran/water=20/5/75, acetonitrile/tetrahydrofuran=80/20 (20 min from the start) and acetonitrile/tetrahydrofuran=50/50 (35 min from the start), at a flow rate of 1.0 ml/min. An absorbance at 280 nm was detected.

The content of the dimeric compound and the content of the specific epoxy monomer, calculated from the area ratio of a peak with respect to the total peaks as detected, were 20% by mass (dimeric compound) and 66% by mass (specific epoxy monomer), respectively.

Example 1

81.3 parts by mass of Resin 1 and 18.7 parts by mass of 4,4'-diaminodiphenylsulfone were placed in a stainless steel dish, and heated on a hot plate to 180° C. After the resin in the dish was melted, it was heated at 180° C. for 1 hour. After cooling to room temperature, the resin was taken out from the dish and heated in an oven at 230° C. for 1 hour to complete the curing.

A sample for evaluating fracture toughness having a size of 3.75 mm×7.5 mm×33 mm and a sample for evaluating glass transition temperature having a size of 2 mm×0.5 mm×40 mm were prepared from the cured product.

Example 2

Samples were prepared in the same manner as Example 1, except that 91.6 parts by mass of Resin 1 and 8.4 parts by mass of m-phenylenediamine, as a curing agent, were used.

Example 3

Samples were prepared in the same manner as Example 1, except that 91.6 parts by mass of Resin 1 and 8.4 parts by mass of p-phenylenediamine, as a curing agent, were used.

Example 4

Samples were prepared in the same manner as Example 1, except that 92.9 parts by mass of Resin 1 and 7.1 parts by mass of 4,4'-diaminobenzanilide, as a curing agent, were used.

Example 5

Samples were prepared in the same manner as Example 1, except that 87.2 parts by mass of Resin 1 and 12.8 parts by mass of 1,5-diaminonaphthalene, as a curing agent, were used.

Example 6

Samples were prepared in the same manner as Example 1, except that 84.5 parts by mass of Resin 1 and 15.5 parts by mass of 4,4'-diaminodiphenylmethane, as a curing agent, were used.

Example 7

Samples were prepared in the same manner as Example 1, except that 77.8 parts by mass of Resin 1 and 22.2 parts by mass of trimethylene-bis-4-aminobenzoate, as a curing agent, were used.

Comparative Example 1

Samples were prepared in the same manner as Example 1, except that 73.8 parts by mass of an epoxy resin (YL6121H, Mitsubishi Chemical Corporation) and 26.2 parts by mass of 4,4'-diaminodiphenylsulfone, as a curing agent, were used.

Comparative Example 2

Samples were prepared in the same manner as Example 1, except that 75.0 parts by mass of an epoxy resin (YL980, Mitsubishi Chemical Corporation) and 25.0 parts by mass of 4,4'-diaminodiphenylsulfone, as a curing agent, were used.

Comparative Example 3

Samples were prepared in the same manner as Example 1, except that 86.5 parts by mass of Resin 1 and 13.5 parts by mass of sulfanilamide, as a curing agent, were used.

(Confirmation of Smectic Structure)

Samples of Examples 1 to 8 and Comparative Examples 1 to 4 were subjected to X-ray diffraction measurement (with X-ray diffractometer, Rigaku Corporation) to examine formation of a liquid crystal structure. The measurement was conducted by using CuKα1line under a tube voltage of 50 kV, a tube current of 300 mA, a scan rate of 10/min, in a range of 2θ=2° to 30°.

(Measurement of Fracture Toughness)

The fracture toughness of the samples was measured by a three-point bending test according to ASTM D5045 with a tester (Instron 5948, Instron).

(Measurement of Heat Resistance)

The glass temperature of the samples was measured as an indicator for heat resistance.

The measurement was performed by a dynamic viscoelasticity measurement (tensile mode) at a vibration of 10 Hz, rate of temperature elevation of 5° C./min and a distortion of 0.1%, using RSA-G2 (TA Instruments). A peak shown in a tan δ chart was determined as a glass transition temperature.

The liquid crystal structure (formation of smectic structure) and the measurement results of fracture toughness and glass transition temperature are shown in Table 1.

TABLE 1

| | Smectic structure is formed | Fracture toughness [MPa · m$^{1/2}$] | Glass transition temperature [° C.] |
|---|---|---|---|
| Example 1 | Yes | 1.33 | 242 |
| Example 2 | Yes | 1.16 | 191 |
| Example 3 | Yes | 2.20 | 189 |
| Example 4 | Yes | 1.68 | 212 |
| Example 5 | Yes | 2.22 | 201 |

TABLE 1-continued

|  | Smectic structure is formed | Fracture toughness [MPa · m$^{1/2}$] | Glass transition temperature [° C.] |
| --- | --- | --- | --- |
| Example 6 | Yes | 1.99 | 190 |
| Example 7 | Yes | 2.11 | 191 |
| Comparative Example 1 | No | 0.80 | 257 |
| Comparative Example 2 | No | 0.72 | 226 |
| Comparative Example 3 | No | 1.58 | 169 |

As shown in Table 1, in the Examples, in which an epoxy resin composition including a specific epoxy compound and a specific curing agent was used, a smectic structure was formed in a cured product, and exhibited a high degree of fracture toughness and transition temperature.

In Comparative Examples 1 and 2, in which an epoxy resin composition not including a specific epoxy compound was used, a smectic structure was not formed in a cured product and exhibited a lower fracture toughness than the Examples.

In Comparative Example 3, in which a compound having one amino group that is directly bound to an aromatic was used instead of a specific curing agent, a smectic structure was not formed in a cured product and exhibited a lower glass transition temperature than the Examples.

The disclosure of Japanese Application No. 2016-123976 is incorporated herein in its entirety.

All publications, patent applications, and technical standards mentioned in this specification are herein incorporated by reference to the same extent as if each individual publication, patent application, or technical standard was specifically and individually indicated to be incorporated by reference.

The invention claimed is:

1. An epoxy resin composition that comprises an epoxy resin and a curing agent,
   the epoxy resin comprising an epoxy compound that has, in one molecule, two structural units represented by the following Formula (I) and two or more epoxy groups, present in a content of up to 20% by mass of the total epoxy resin:

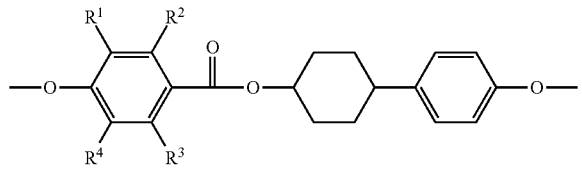

(I)

wherein, in Formula (I), each of R1 to R4 independently represents a hydrogen atom or an alkyl group having 1 to 3 carbon atoms, and
the curing agent comprising a compound having two or more amino groups that are directly bound to an aromatic ring.

2. The epoxy resin composition according to claim 1, wherein the epoxy resin composition is capable of forming a smectic structure in a cured state.

3. A cured product of the epoxy resin composition according to claim 1.

4. A composite material comprising the cured product according to claim 3 and a reinforcing material.

5. The composite material according to claim 4, wherein the reinforcing material comprises a carbon material.

6. The epoxy resin composition according to claim 1, wherein the epoxy compound that has, in one molecule, two structural units represented by the Formula (I) and two or more epoxy groups, is contained in a content of 10% by mass or more and 20% by mass or less of the total epoxy resin.

7. The epoxy resin composition according to claim 1, wherein the epoxy compound that has, in one molecule, two structural units represented by the Formula (I) and two or more epoxy groups, is contained in a content of 15% by mass or more and 20% by mass or less of the total epoxy resin.

8. The epoxy resin composition according to claim 1, wherein the epoxy compound that has, in one molecule, two structural units represented by the Formula (I) and two or more epoxy groups, is contained in a content of 20% by mass of the total epoxy resin.

9. The epoxy resin composition according to claim 1, wherein the epoxy compound that has, in one molecule, two structural units represented by the Formula (I) and two or more epoxy groups, comprises at least one selected from the group consisting of the compounds represented by the following Formulae (II-A) to (II-C):

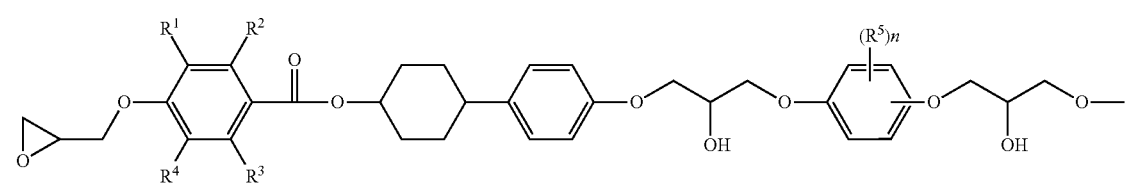

(II-A)

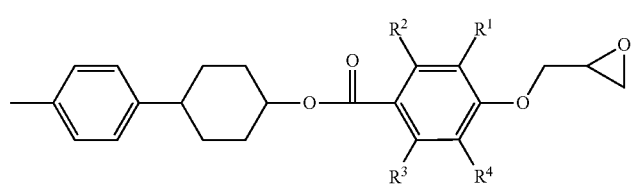

-continued
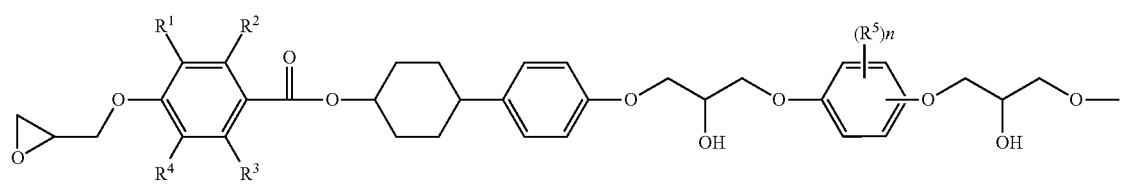
(II-B)
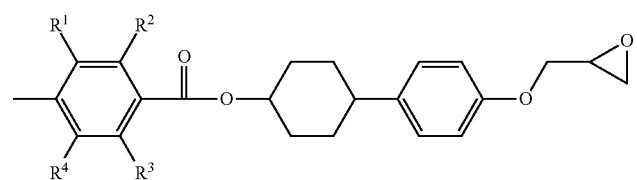
(II-C)
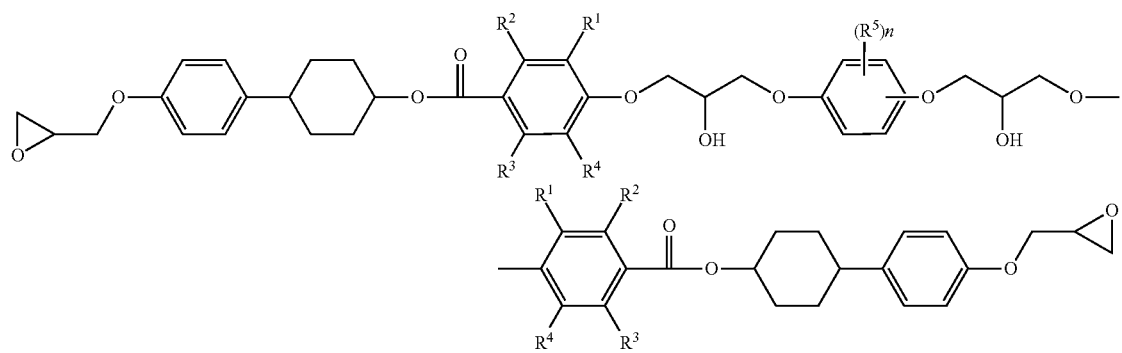
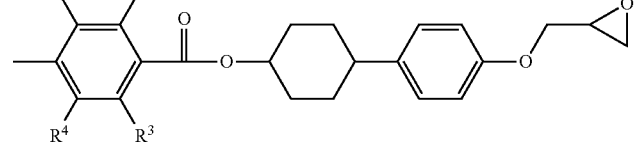
wherein, in Formulae (II-A) to (II-C), each of $R^1$ to $R^4$ independently represents a hydrogen atom or an alkyl group having 1 to 3 carbon atoms, each of $R^5$ independently represents an alkyl group having 1 to 8 carbon atoms, and n represents an integer of 0 to 4.
* * * * *